US010744828B2

(12) United States Patent
So et al.

(10) Patent No.: US 10,744,828 B2
(45) Date of Patent: Aug. 18, 2020

(54) TIRE INCLUDING CONTACT CHARGING TYPE SELF-POWER GENERATION MODULE

(71) Applicant: HANKOOK TIRE CO., LTD., Seoul (KR)

(72) Inventors: Soon Hong So, Daejeon (KR); Jeong Heon Kim, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 413 days.

(21) Appl. No.: 15/897,850

(22) Filed: Feb. 15, 2018

(65) Prior Publication Data

US 2018/0326801 A1 Nov. 15, 2018

(30) Foreign Application Priority Data

May 11, 2017 (KR) .................. 10-2017-0058736

(51) Int. Cl.
*B60C 23/04* (2006.01)
*B60C 19/00* (2006.01)
*B29D 30/00* (2006.01)

(52) U.S. Cl.
CPC ...... *B60C 23/0493* (2013.01); *B29D 30/0061* (2013.01); *B60C 19/002* (2013.01);
(Continued)

(58) Field of Classification Search
USPC .............................................. 73/146–146.8
See application file for complete search history.

(56) References Cited

U.S. PATENT DOCUMENTS 4,510,484 A * 4/1985 Snyder ............... B60C 23/0411
340/438
6,175,302 B1 * 1/2001 Huang ............... B60C 23/0411
340/442
(Continued)

FOREIGN PATENT DOCUMENTS

CN 206277898 U * 6/2017
JP 3736804 B2 1/2006
(Continued)

*Primary Examiner* — Andre J Allen
(74) *Attorney, Agent, or Firm* — Novick, Kim & Lee, PLLC; Jae Youn Kim (57) ABSTRACT

A tire including a contact charging type self-power generation module, and more particularly, a tire including a contact charging type self-power generation module that can generate electricity by charging static electricity occurring within a tire and a sound-absorbing material of the tire and that can operate a sensor using the generated electricity is provided. The tire including a contact charging type self-power generation module includes a sound-absorbing material provided within an inner liner of the tire; an internal electrode portion provided within the sound-absorbing material and extended in a length direction of the sound-absorbing material; and an external electrode portion having a first external electrode provided separately from the sound-absorbing material and provided parallel to the internal electrode portion, wherein when the tire moves, as the sound-absorbing material moves, the internal electrode portion and the external electrode portion are charged with electricity to generate electricity.

11 Claims, 6 Drawing Sheets

(52) U.S. Cl.
CPC ........ *B60C 23/041* (2013.01); *B60C 23/0411* (2013.01); *B29D 2030/0094* (2013.01)

(56) References Cited

U.S. PATENT DOCUMENTS

| | | | | |
|---|---|---|---|---|
| 2003/0061873 A1* | 4/2003 | Lin | ................ | B60C 23/041 73/146.5 |
| 2006/0006991 A1* | 1/2006 | Tyndall | ................ | G01C 22/00 340/442 |
| 2011/0012723 A1* | 1/2011 | Adamson | ................ | B60C 23/0408 340/447 |
| 2011/0140578 A1* | 6/2011 | Ko | ................ | H01L 41/1138 310/339 |
| 2015/0005982 A1* | 1/2015 | Muthukumar | ................ | G01P 15/00 701/1 |
| 2018/0326801 A1* | 11/2018 | So | ................ | B60C 19/002 |

FOREIGN PATENT DOCUMENTS

| | | | | |
|---|---|---|---|---|
| JP | 2014239647 A | | 12/2014 | |
| KR | 20050063099 A | * | 6/2005 | ......... B60C 23/0411 |
| KR | 10-1690833 B1 | | 12/2016 | |
| KR | 101887809 B1 | * | 8/2018 | ......... B60C 23/0493 |
| KR | 2085006 B1 | * | 5/2020 | ........... B60C 23/041 |

* cited by examiner

TIRE INCLUDING CONTACT CHARGING TYPE SELF-POWER GENERATION MODULE

CROSS-REFERENCE TO RELATED APPLICATION

This application claims priority to and the benefit of Korean Patent Application No. 10-2017-0058736, filed on May 11, 2017, the disclosure of which is incorporated herein by reference in its entirety.

BACKGROUND OF THE INVENTION

Field of the Invention

The present invention relates to a tire including a contact charging type self-power generation module, and more particularly, to a tire including a contact charging type self-power generation module that can generate electricity by charging static electricity occurring within a tire and a sound-absorbing material of the tire and that can operate a sensor using the generated electricity.

Description of the Related Art

Nowadays, a research on an apparatus for generating electricity within a tire has been actively performed.

For example, up to now, when a tire moves, research and development on an electric power system of a piezoelectric method using a force in which the tire is pressed by the ground has been performed.

However, when a piezoelectric method electric power system is applied to a tire, the piezoelectric method electric power system is very expensive and a life-span of a piezoelectric material is short and thus there is a problem that it is difficult to permanently use the piezoelectric method electric power system.

More specifically, a method of generating electricity using a pressure or a force applied to a sensor is referred to as a piezo-generation method. Because such a piezo-generation method has low efficiency and additionally requires a circuit that amplifies using an OP-AMP, compared with a power generation method of using static electricity, there is a drawback that the piezo-generation method has a complex structure and cannot permanently use a piezo-element.

Further, nowadays, when driving a vehicle, technology that generates electricity using a heat generated due to a friction between a tire and the ground has been developed.

However, there is a problem that technology that generates electricity using a heat generated due to a friction between a tire and the ground is inefficient in an environment in which a frictional heat of the tire cannot fully occur due to an influence of weather.

Therefore, a tire including a self-power generation module that can more efficiently and economically generate electricity is required.

PRIOR ART DOCUMENT

Patent Document (Patent document 1) Korean Patent Publication No. 10-1690833

SUMMARY OF THE INVENTION

Technical Problem

The present invention has been made in an effort to provide a tire including a contact charging type self-power generation module that generates electricity by charging static electricity occurring within a tire and a sound-absorbing material of the tire and that can operate a sensor using the electricity.

The technical problems of the present invention are not limited to the above-described technical problems and the other technical problems will be understood by those skilled in the art from the following description.

In accordance with an exemplary embodiment, a tire including a contact charging type self-power generation module includes a sound-absorbing material provided within an inner liner of the tire; an internal electrode portion provided within the sound-absorbing material and extended in a length direction of the sound-absorbing material; and an external electrode portion having a first external electrode provided separately from the sound-absorbing material and provided parallel to the internal electrode portion, wherein when the tire moves, as the sound-absorbing material moves, the internal electrode portion and the external electrode portion are charged with electricity to generate electricity.

The first external electrode may be provided in a lower portion or an upper portion of the sound-absorbing material.

The tire may further include a fixing bar that connects and fixes the sound-absorbing material and the first external electrode and including an electric wire.

The fixing bar may be made of a material having an insulating property.

The tire may further include a case that houses the sound-absorbing material, the internal electrode portion, and the external electrode portion therein.

The tire may further include a power source unit connected to the internal electrode portion and the external electrode portion to receive generated electricity.

The power source unit may include a pneumatic sensor that measures an air pressure of the tire; and a power source element that converts electricity of a non-sinusoidal wave or a sine wave occurring in the internal electrode portion and the external electrode portion to a DC form to provide the electricity to the pneumatic sensor, wherein the power source element may supply electricity with a predetermined voltage to the pneumatic sensor.

In accordance with an exemplary embodiment, a tire including a contact charging type self-power generation module includes a first sound-absorbing material bonded to an inner side surface of an inner liner of the tire; an external electrode portion provided at an upper portion of the first sound-absorbing material; a second sound-absorbing material provided at an upper portion of the external electrode portion; and an internal electrode portion provided within the second sound-absorbing material and extended in a length direction of the second sound-absorbing material, wherein when the tire moves, as the first sound-absorbing material and the second sound-absorbing material move, the first sound-absorbing material, the second sound-absorbing material, and the external electrode portion are provided separately from each other, and the internal electrode portion and the external electrode portion are charged with electricity to generate electricity.

The external electrode portion may include a fourth external electrode provided parallel to the internal electrode portion.

The tire may further include a fixing bar that connects and fixes the first sound-absorbing material, the second sound-absorbing material, and the fourth external electrode and including an electric wire.

A configuration of the present invention for achieving the object provides a vehicle that mounts the tire including the contact charging type self-power generation module.

Advantageous Effect(s) of the Invention

According to the present invention having the above configuration, because a self-power generation module using static electricity is provided within a tire, electricity can be efficiently generated. In the present invention, because generated electricity can be used for operating a pneumatic sensor, a separate external power source for operating the pneumatic sensor is unnecessary and thus the tire is economical.

Further, a sound-absorbing material of the tire is made of a material, which occurs much static electricity, such as polyurethane. Therefore, when an internal electrode portion is provided within a sound-absorbing material, as in the present invention, electricity can be more efficiently generated.

Further, according to the present invention, by generating electricity using static electricity occurring within the tire, static electricity occurring within the tire and the vehicle can be effectively removed.

Further, according to the present invention, because electricity is generated using a sound-absorbing material, a generation area is large, a generation capacity is large, and power can be uniformly generated, compared with a conventional piezo-generation method.

Further, because a self-power generation module of the present invention is formed in an integral structure connected to a sound-absorbing material, a noise reduction function of a conventional tire made of a sound-absorbing material can be maintained.

The effects of the present invention are not limited to the above-described effects and it should be understood that the effects include entire effects that can be deduced from a configuration of the invention described in a detailed description of the present invention or claims.

DETAILED DESCRIPTION OF THE INVENTION

Hereinafter, the present invention will be described in detail with reference to the attached drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected (accessed, contact, and coupled)" to another element, the element may be "directly connected" to the other element and "indirectly connected" to the other element through a third element. Further, unless explicitly described to the contrary, the word "comprise" and variations such as "comprises" or "comprising", will be understood to imply the inclusion of stated elements but not the exclusion of any other elements.

Terms used in the present application are used for describing a specific exemplary embodiment and do not limit the present invention. When using in a description of the present invention and the appended claims, a singular form includes a plurality of forms unless it is explicitly differently represented. Further, in the present specification, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

Hereinafter, an exemplary embodiment according to the present invention will be described in detail with reference to the attached drawings.

Figure 1:
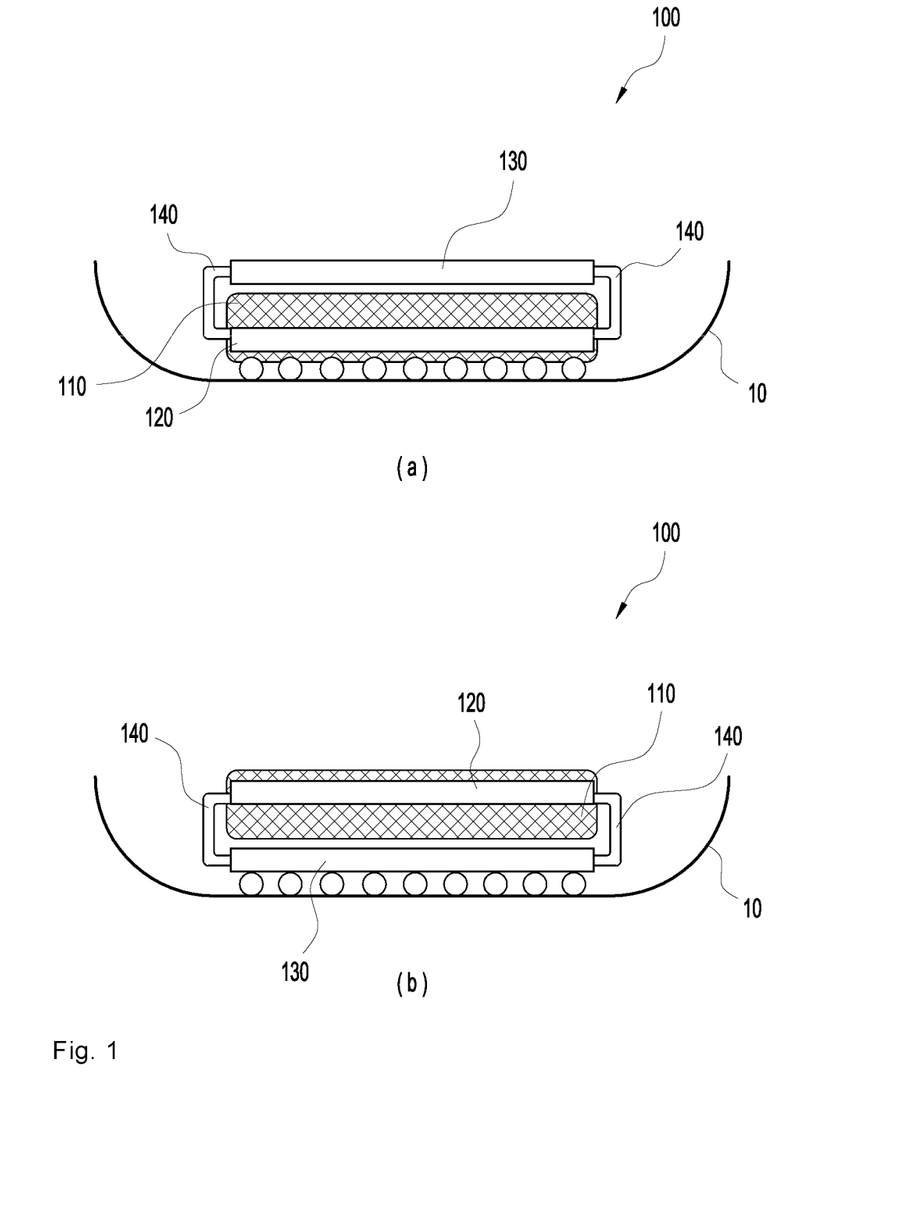
FIG. 1 is a diagram illustrating a tire including a contact charging type self-power generation module according to a first exemplary embodiment of the present invention.

FIG. 1 is a diagram illustrating a tire including a contact charging type self-power generation module according to a first exemplary embodiment of the present invention.

As shown in FIG. 1, a tire 100 including a contact charging type self-power generation module includes a sound-absorbing material 110, an internal electrode portion 120, and an external electrode portion, and when the tire moves, the sound-absorbing material 110 moves and thus the internal electrode portion 120 and the external electrode portion are charged with electricity to generate electricity.

The sound-absorbing material 110 may be provided within an inner liner 10 of the tire. Here, the sound-absorbing material 110 may be made of a polyurethane material, but the sound-absorbing material 110 is not limited thereto and may include an entire material that enables static electricity according to a friction to well occur to be well charged with electricity and having a sound-absorbing function. For example, the sound-absorbing material 110 may be made of a polymer material that can be well charged with electricity at a sponge structure for sound-absorption.

An adhesive using when bonding the sound-absorbing material 110 to the inside of the inner liner 10 of the tire may be a sealant adhesive or a silicon-based adhesive, but an adhesive kind is not limited thereto.

The internal electrode portion 120 is provided within the sound-absorbing material 110 and may be extended in a length direction of the sound-absorbing material 110.

The external electrode portion may be separated from the sound-absorbing material 110 and includes a first external electrode 130 provided parallel to the internal electrode portion 120.

The first external electrode 130 may be provided at a lower portion or an upper portion of the sound-absorbing material 110. Here, an upper portion of the sound-absorbing material 110 indicates an internal direction of the tire, and a lower portion of the sound-absorbing material 110 indicates a direction of the inner liner 10 of the tire to which the sound-absorbing material is bonded and they are equally applied hereinafter. Therefore, FIG. 1A illustrates a state in which the first external electrode 130 is positioned at an upper portion of the sound-absorbing material 110, and FIG. 1B illustrates a state in which the first external electrode 130 is positioned at a lower portion of the sound-absorbing material 110.

Further, the internal electrode portion 120 and the external electrode portion may be made of a conductive material and a metal having predetermined ductility. For example, the internal electrode portion 120 and the external electrode portion may be made of a material such as a polymer, a carbon bar, a carbon nano fiber, and a graphene film that includes a conductive material to be well charged with electricity.

The internal electrode portion 120 and the external electrode portion may have a thickness that does not exceed 2 mm, and the first external electrode 130 may be provided separately by a gap of more than 0 to 5 cm or less from the sound-absorbing material 110.

Further, the tire 100 including the contact charging type self-power generation module may further include a fixing bar 140 that connects and fixes the sound-absorbing material 110 and the first external electrode 130 and including an electric wire.

Specifically, the fixing bar 140 may connect both ends of the sound-absorbing material 110 and the first external electrode 130 to fix the sound-absorbing material 110 and the first external electrode 130 such that the sound-absorbing material 110 and the first external electrode 130 are integrally formed. An electric wire that moves electric charges is provided in the fixing bar 140 to enable the internal electrode portion 120 and the first external electrode 130 to be connected to a power source unit 150 to be described later. The fixing bar 140 may be made of a material having an insulating property.

Figure 2:
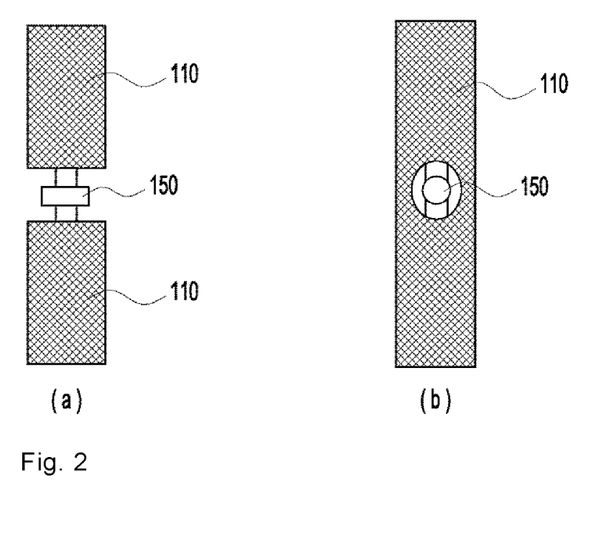
FIG. 2 is a diagram illustrating an installation position of a power source unit of a tire including a contact charging type self-power generation module according to an exemplary embodiment of the present invention.

FIG. 2 is a diagram illustrating an installation position of a power source unit of a tire including a contact charging type self-power generation module according to an exemplary embodiment of the present invention.

Referring to FIGS. 1 and 2, the tire 100 including a contact charging type self-power generation module may further include a power source unit 150 connected to the internal electrode portion 120 and the external electrode portion to receive generated electricity. The power source unit 150 includes a pneumatic sensor (not shown) and a power source element (not shown).

The pneumatic sensor is provided to measure an air pressure of the tire.

The power source element may convert electricity of a non-sinusoidal wave or a sine wave occurring in the internal electrode portion 120 and the external electrode portion to a DC form to provide the converted electricity to the pneumatic sensor. The power source element constantly supplies electricity of a predetermined voltage required by the pneumatic sensor.

However, the power source element may not limit to provide electricity to only the pneumatic sensor, but may be provided to supply electricity to a separate position in which the vehicle requires.

Further, as shown in FIG. 2A, the power source unit 150 may be provided between the adjacent sound-absorbing materials 110. Specifically, the tire 100 including the contact charging type self-power generation module may be provided in the plural in an inner circumference direction of the tire. In this way, when the tire 100 including the contact charging type self-power generation module is provided in the plural in an inner circumference direction of the tire, the power source unit 150 may be provided between the sound-absorbing materials 110 of the tire 100 including a pair of adjacent contact charging type self-power generation modules.

Alternatively, when the tire 100 including a contact charging type self-power generation module is in a state extended in an inner circumference direction thereof, by enabling a length of the sound-absorbing material 110 to be smaller than that of an inner circumferential surface of the tire, a space may be formed between both ends of the sound-absorbing material 110. At the formed space, the power source unit 150 may be provided.

Further, as shown in FIG. 2B, the power source unit 150 may be provided at a space formed at the inside of the sound-absorbing material 110. Specifically, as shown in FIG. 2B, when the tire 100 including a contact charging type self-power generation module is in a state extended in an inner circumference direction thereof, a space that may install a power source portion may be formed in a shape and size corresponding to the power source unit 150 at both ends of the sound-absorbing material 110. For example, as shown in FIG. 2B, by cutting out each of both ends of the sound-absorbing material 110 in a half-circle shape, the power source portion may be installed.

In the tire 100 including a contact charging type self-power generation module provided in this way, when the vehicle runs, the sound-absorbing material 110 moves according to a movement of the tire. The moved sound-absorbing material 110 may enable the internal electrode portion 120 installed therein and the first external electrode 130 separately installed by a predetermined gap from the internal electrode portion 120 to be charged with electricity. In this way, as the internal electrode portion 120 and the first external electrode 130 are charged with electricity, electricity generated by a movement of electric charges is provided to the power source unit 150 by an electric wire. A power source element of the power source unit 150 controls a voltage of received electricity and provides electricity having a controlled voltage to the pneumatic sensor to measure an air pressure of the tire. The tire 100 including a contact charging type self-power generation module provided in this way may operate a pneumatic sensor without a separate external power source and thus the tire is economical.

Further, the tire 100 including a contact charging type self-power generation module collects static electricity occurring within a running vehicle to generate electricity and thus may efficiently generate much electricity while removing static electricity occurring within the running vehicle.

Figure 3:
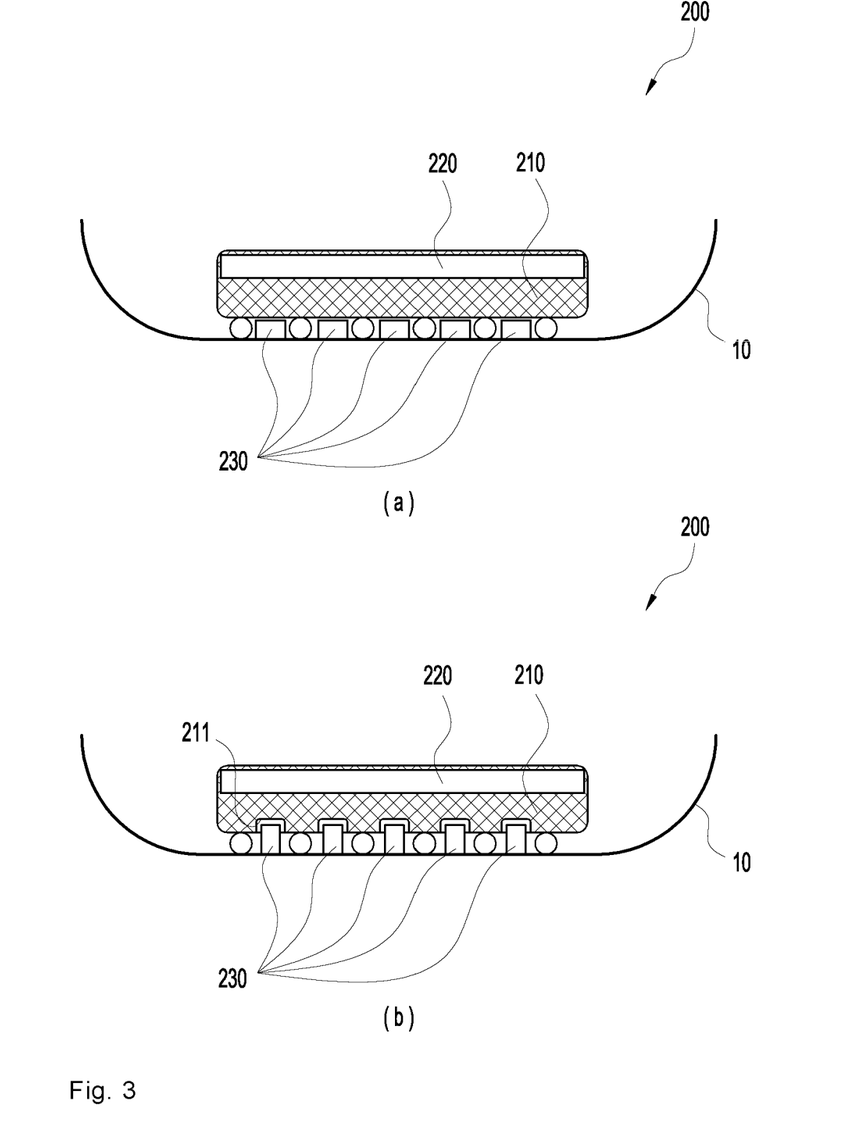
FIG. 3 is a diagram illustrating a tire including a contact charging type self-power generation module having a plurality of external electrodes according to a second exemplary embodiment of the present invention.

FIG. 3 is a diagram illustrating a tire including a contact charging type self-power generation module according to a second exemplary embodiment of the present invention.

As shown in FIG. 3, a tire 200 including a contact charging type self-power generation module having a plurality of external electrodes according to the second exemplary embodiment includes a sound-absorbing material 210, an internal electrode portion 220, and an external electrode portion, and when the tire moves, the sound-absorbing material 210 moves and thus the internal electrode portion 220 and the external electrode portion are charged with electricity to generate electricity.

The sound-absorbing material 210 may be provided within an inner liner 10 of the tire. Here, the sound-absorbing material 210 may be made of a polyurethane material, but the sound-absorbing material 210 is not limited thereto and may include an entire material well charged with electricity and having a sound-absorbing function. For example, the sound-absorbing material 210 may be made of a polymer material well charged with electricity at a sponge structure for sound-absorption.

The internal electrode portion 220 is provided within the sound-absorbing material 210 and may be extended in a length direction of the sound-absorbing material 210.

The external electrode portion is provided between the sound-absorbing material 210 and the inner liner 10 and includes a plurality of second external electrodes 230 bonded to an inner side surface of the inner liner 10.

Specifically, as shown in FIG. 3A, the sound-absorbing material 210 may be bonded to an inner side surface of the inner liner 10 by an adhesive, and the second external electrode 230 may be positioned between the sound-absorbing material 210 and the inner liner 10 and may be bonded in a state separated by a predetermined gap from the sound-absorbing material 210.

In order to well form a predetermined gap between the sound-absorbing material 210 and the second external electrode 230, as shown in FIG. 3B, a shape of the sound-absorbing material 210 may be adjusted. Specifically, at a lower portion of the sound-absorbing material 210, a receiving hole 211 corresponding to a shape of the second external electrode 230 may be formed.

When the sound-absorbing material 210 is bonded to an inner side surface of the inner liner 10, the receiving hole 211 may be provided to insert the second external electrode 230. For example, as shown in FIG. 3B, the receiving hole 211 is formed at a low surface of the sound-absorbing material 210 that contacts the inner liner 10, but may be formed to correspond to a position, the number, and a shape of the second external electrode 230 bonded to an inner side surface of the inner liner 10.

The receiving hole 211 provided in this way enables the sound-absorbing material 210 to be bonded to come in more close contact with the inner liner 10 to enhance safety and may enable to form a predetermined gap between the sound-absorbing material 210 and the second external electrode 230.

Particularly, as described above, the second external electrode 230 inserted into the receiving hole 211 enables the sound-absorbing material 210 to be charged with electricity when the sound-absorbing material 210 vertically moves as well as when the sound-absorbing material 210 moves in a lateral direction, thereby generating electricity.

Further, the tire 200 including a contact charging type self-power generation module having a plurality of external electrodes according to a second exemplary embodiment further includes a power source unit. However, a power source unit of the tire 200 including a contact charging type self-power generation module having a plurality of external electrodes according to a second exemplary embodiment has substantially the same configuration as that of the power source unit 150 of the tire 100 including a contact charging type self-power generation module according to the first exemplary embodiment and therefore a detailed description thereof will be omitted.

Figure 4:
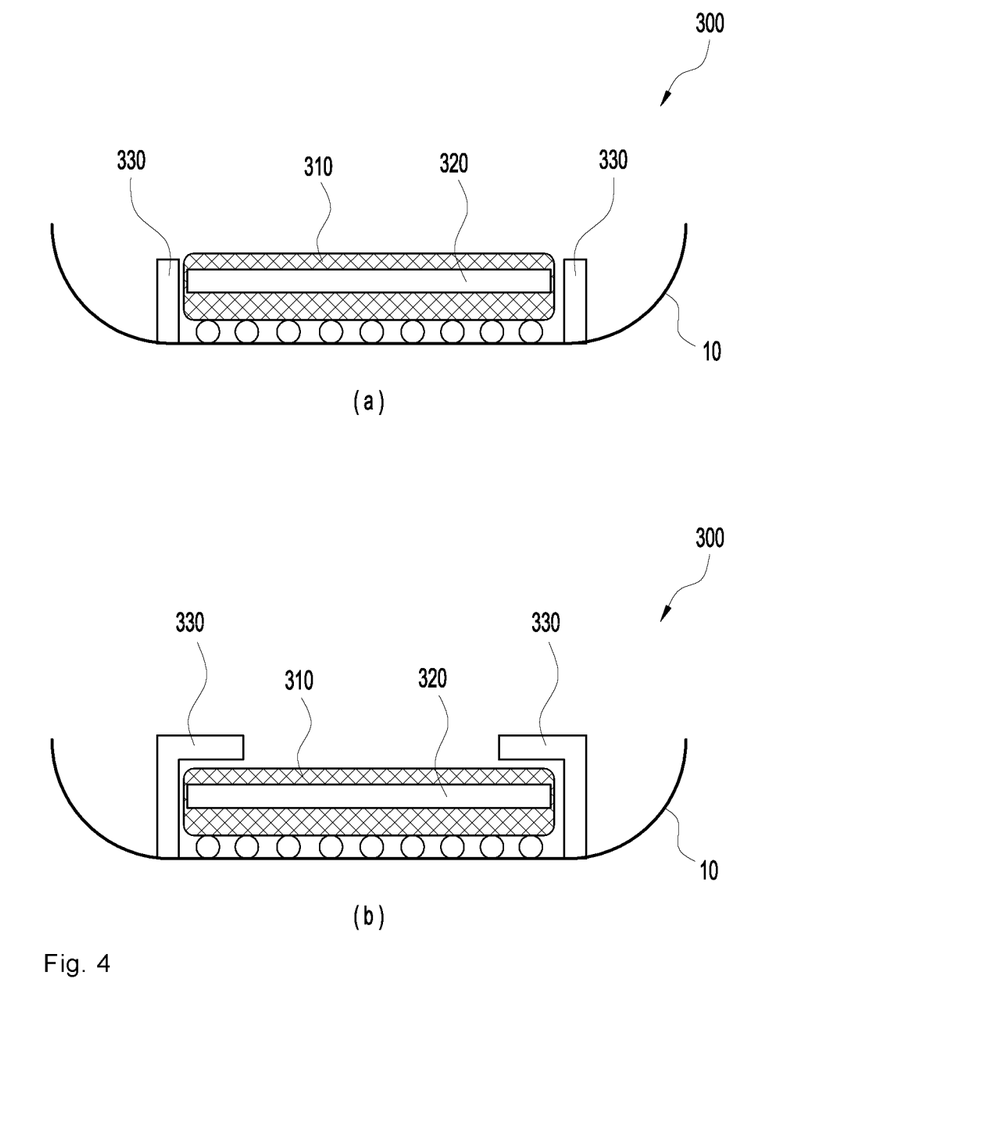
FIG. 4 is a diagram illustrating a tire including a contact charging type self-power generation module having a side external electrode according to a third exemplary embodiment of the present invention.

FIG. 4 is a diagram illustrating a tire including a contact charging type self-power generation module according to a third exemplary embodiment of the present invention.

As shown in FIG. 4, a tire 300 including a contact charging type self-power generation module having a side external electrode according to a third exemplary embodiment includes a sound-absorbing material 310, an internal electrode portion 320, and an external electrode portion, and when the tire moves, the sound-absorbing material 310 moves and thus the internal electrode portion 320 and the external electrode portion are charged electricity to generate electricity.

The sound-absorbing material 310 may be provided within an inner liner 10 of the tire. Here, the sound-absorbing material 310 may be made of a polyurethane material, but the sound-absorbing material 310 is not limited thereto and may include an entire material well charged with electricity and having a sound-absorbing function. For example, the sound-absorbing material 310 may be made of a polymer material well charged with electricity in a sponge structure for sound-absorption.

The internal electrode portion 320 may be provided within the sound-absorbing material 310 and may be extended in a length direction of the sound-absorbing material 310.

The external electrode portion may include third external electrodes 330 provided in a pair at both sides of the sound-absorbing material 310.

Specifically, as shown in FIG. 4A, one end of the third external electrode 330 may be bonded to an inner side surface of an inner liner 10, and the other end thereof may be extended in a vertical direction from an inner side surface of the inner liner 10.

Alternatively, as shown in FIG. 4B, one end of the third external electrode 330 may be bonded to an inner side surface of the inner liner 10, the other end thereof may be extended in a vertical direction from an inner side surface of the inner liner 10, and the other end of the third external electrode 330 may be bent and extended in a vertical direction, but a pair of third external electrodes 330 may be bent and extended in a facing direction.

When the sound-absorbing material 310 moves in a direction of the right side, the left side, the upper side, and the lower side, the third external electrode 330 provided in this way is well charged with electricity and thus generation efficiency can be enhanced.

Further, the tire 300 including a contact charging type self-power generation module having a side external electrode according to a third exemplary embodiment further includes a power source unit. However, the power source unit of the tire 300 including a contact charging type self-power generation module having a side external electrode according to a third exemplary embodiment has substantially the same configuration as that of the power source unit 150 of the tire 100 including a contact charging type self-power generation module according to the first exemplary embodiment and therefore a detailed description thereof will be omitted.

Figure 5:
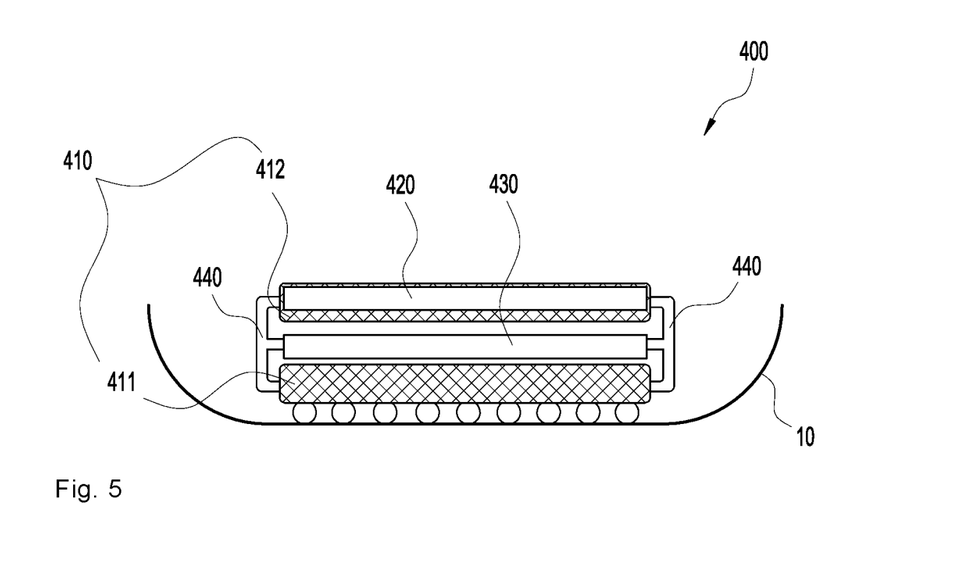
FIG. 5 is a diagram illustrating a tire including a contact charging type self-power generation module according to a fourth exemplary embodiment of the present invention.

FIG. 5 is a diagram illustrating a tire including a contact charging type self-power generation module according to a fourth exemplary embodiment of the present invention.

As shown in FIG. 5, a tire 400 including a contact charging type self-power generation module according to a fourth exemplary embodiment includes a sound-absorbing material 410, an internal electrode portion 420, and an external electrode portion, and when the tire moves, the sound-absorbing material 410 moves and thus the internal electrode portion 420 and the external electrode portion are charged with electricity to generate electricity.

The sound-absorbing material 410 includes a first sound-absorbing material 411 and a second sound-absorbing material 412, and here, the sound-absorbing material 410 may be made of a polyurethane material, but the sound-absorbing material 410 is not limited thereto. That is, the sound-absorbing material 410 may include an entire material well charged with electricity and having a sound-absorbing function. For example, the sound-absorbing material 410 may be made of a polymer material well charged with electricity in a sponge structure for sound-absorption.

The first sound-absorbing material 411 may be provided to bond to an inner side surface of an inner liner 10 of the tire.

At an upper portion of the first sound-absorbing material 411, the external electrode portion may be provided, and at an upper portion of the external electrode portion, the second sound-absorbing material 412 may be provided.

The internal electrode portion 420 may be provided within the second sound-absorbing material 412 and may be extended in a length direction of the second sound-absorbing material 412.

The external electrode portion includes a fourth external electrode 430 provided parallel to the internal electrode portion 420, and the first sound-absorbing material 411, the second sound-absorbing material 412, and the fourth external electrode 430 may be separated from each other.

When the tire 400 including a contact charging type self-power generation module according to the fourth exemplary embodiment provided in this way moves, the first sound-absorbing material 411 and the second sound-absorbing material 412 move and thus the internal electrode portion 420 and the external electrode portion are charged with electricity to generate electricity.

The tire 400 including a contact charging type self-power generation module according to a fourth exemplary embodiment may further include a fixing bar 440 that connects and fixes the first sound-absorbing material 411, the second sound-absorbing material 412, and a fourth external electrode 413 and including an electric wire.

Specifically, the fixing bar 440 may connect both ends of the sound-absorbing material 410 and the fourth external electrode 430 to integrally fix the sound-absorbing material 410 and the fourth external electrode 430. An electric wire for moving electric charges is provided in the fixing bar 440 to enable the internal electrode portion 420 and the fourth external electrode 430 to be connected to a power source unit. The fixing bar 440 may be made of a material having an insulating property.

The tire 400 including a contact charging type self-power generation module according to a fourth exemplary embodiment further includes a power source unit. However, the power source unit of the tire 400 including the contact charging type self-power generation module according to a fourth exemplary embodiment has substantially the same configuration as that of the power source unit 150 of the tire 100 including a contact charging type self-power generation module according to the first exemplary embodiment and therefore a detailed description thereof will be omitted.

Figure 6:
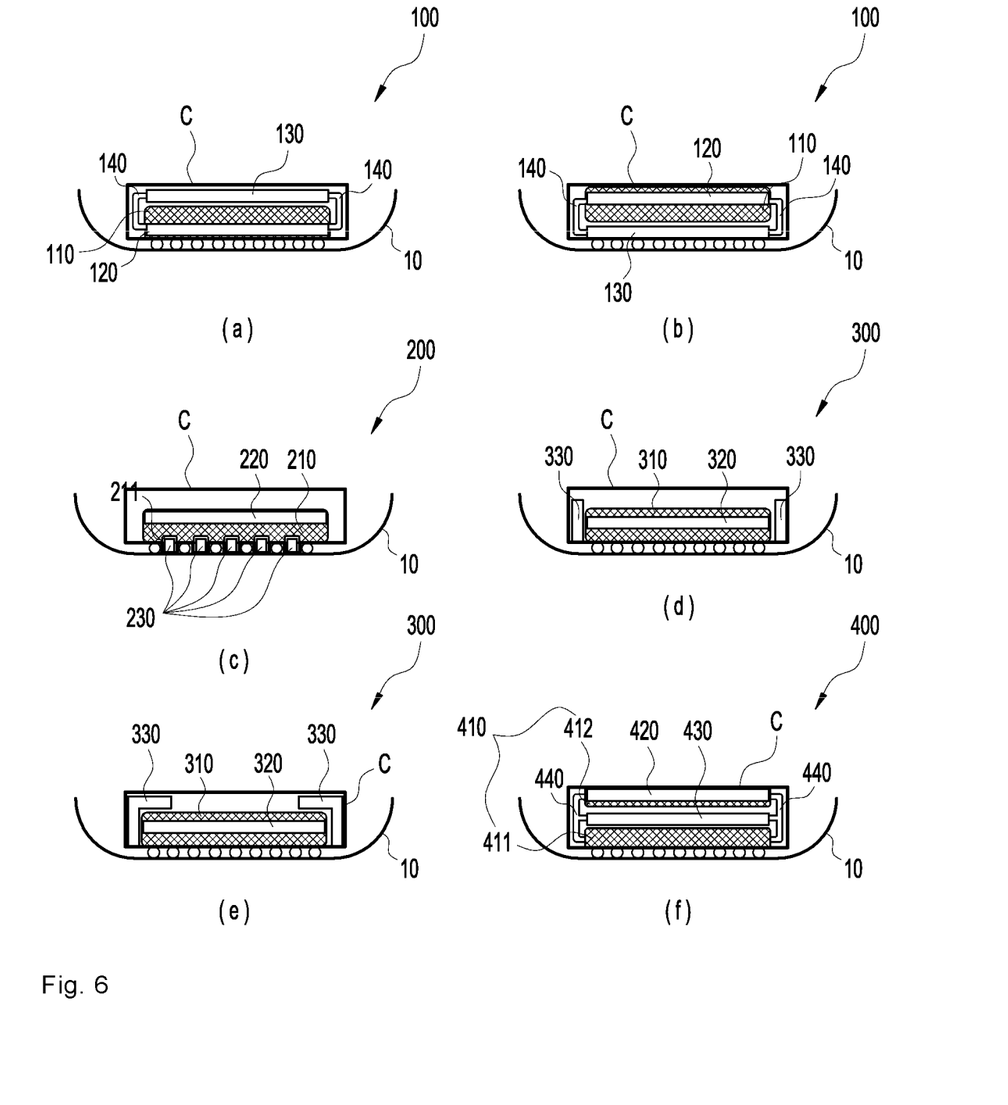
FIG. 6 is a diagram illustrating a tire including a contact charging type self-power generation module having a case according to a first exemplary embodiment to a fourth exemplary embodiment of the present invention.

FIG. 6 is a diagram illustrating a tire including a contact charging type self-power generation module having a case according to a first exemplary embodiment to a fourth exemplary embodiment of the present invention.

As shown in FIG. 6, a tire including a self-power generation module according to a first exemplary embodiment to a fourth exemplary embodiment of the present invention may further include each case C that houses the sound-absorbing material, the internal electrode portion, and the external electrode portion therein.

The case C provided in this way may integrally form the sound-absorbing material, the internal electrode portion, and the external electrode portion to stably form in a module not to separate from an original position even when the tire moves. The tire including a self-power generation module formed in a module in this way may be easily attached to a vehicle or may be easily detached from a vehicle.

The case C may be made of a material having an insulating property and the sound-absorbing material, the internal electrode portion, and the external electrode portion provided therein may be made of a material having an insulation property not to be damaged by a frictional heat between the tire and the ground.

As described above, tires 100, 200, 300, and 400 including a self-power generation module according to a first exemplary embodiment to a fourth exemplary embodiment may have self-power generation modules using static electricity therein to generate efficiently electricity. Because a tire according to the present invention may use generated electricity for operating a pneumatic sensor, a separate external power source for operating the pneumatic sensor is unnecessary and thus the tire according to the present invention is economical.

Further, the sound-absorbing materials 110, 210, 310, and 410 of the present invention are made of a material, which much occurs static electricity, such as polyurethane. Therefore, as in the present invention, when the internal electrode portion 120, 220, 320, 420 are provided within the sound-absorbing materials 110, 210, 310, and 410, electricity may be more efficiently generated.

Further, because the tire according to the present invention generates electricity using static electricity occurring therein, static electricity occurring within the tire and the vehicle can be effectively removed.

Further, because the tire according to the present invention generates electricity using static electricity occurring in the sound-absorbing materials 110, 210, 310, and 410 and the vehicle, a generation area and a generation capacity are large and power can be uniformly generated, compared with a conventional piezo-generation method.

Further, because a self-power generation module according to the present invention is formed in an integral structure connected to the sound-absorbing materials 110, 210, 310, and 410, the tire according to the present invention may maintain a noise reduction function of a conventional tire made of a sound-absorbing material.

As described above, a tire including a self-power generation module according to the first exemplary embodiment to the fourth exemplary embodiment may be mounted in a vehicle.

The foregoing description of the present invention is an illustration, and it may be understood by a person of ordinary skill in the art that the present invention may be easily changed in different detailed forms without changing the technical spirit or an essential characteristic of the present invention. Therefore, it should be understood that the foregoing exemplary embodiments are not limited but are illustrative. For example, each constituent element described in a single type may be distributedly performed, and constituent elements described in a distributed type may be performed in a combined form.

The scope of the present invention is represented by claims to be described later, and it should be analyzed that a meaning and the scope of claims and an entire change or a changed form derived from an equivalent concept thereof are included in the scope of the present invention.

REFERENCE NUMERALS FROM THE FIGURES

10: inner liner
100, 400: tire including contact charging type self-power generation module
110, 210, 310, 410: sound-absorbing material
120, 220, 320, 420: internal electrode portion
130: first external electrode
140, 440: fixing bar
150: power source unit
200: tire including contact charging type self-power generation module having a plurality of external electrodes
211: receiving hole
230: second external electrode
300: tire including contact charging type self-power generation module having side external electrode
330: third external electrode
411: first sound-absorbing material
412: second sound-absorbing material
430: fourth external electrode
C: case

What is claimed is:

1. A tire comprising:
a sound-absorbing material provided within an inner liner of the tire;
an internal electrode portion provided within the sound-absorbing material and extended in a length direction of the sound-absorbing material; and
an external electrode portion having a first external electrode provided separately from the sound-absorbing material and provided parallel to the internal electrode portion,
wherein the internal electrode portion and the external electrode portion are configured as a contact charging type self-power generation module which is arranged to be charged with electricity and to generate electricity upon movement of the sound-absorbing material, when the tire moves.

2. The tire of claim 1, wherein the first external electrode is provided in a lower portion or an upper portion of the sound-absorbing material.

3. The tire of claim 2, comprising:
a fixing bar that connects and fixes the sound-absorbing material and the first external electrode, and having an electric wire.

4. The tire of claim 3, wherein the fixing bar is made of a material having an insulating property.

5. The tire of claim 1, comprising:
a case that houses the sound-absorbing material, the internal electrode portion, and the external electrode portion therein.

6. The tire of claim 1, comprising:
a power source unit connected to the internal electrode portion and the external electrode portion to receive generated electricity.

7. The tire of claim 6, wherein the power source unit comprises:
a pneumatic sensor for measuring an air pressure of the tire; and
a power source element for converting electricity of a non-sinusoidal wave or a sine wave occurring in the internal electrode portion and the external electrode portion to a DC form to provide the converted electricity to the pneumatic sensor,
wherein the power source element is configured to supply electricity of a predetermined voltage to the pneumatic sensor.

8. A tire comprising:
a first sound-absorbing material bonded to an inner side surface of an inner liner of the tire;
an external electrode portion provided at an upper portion of the first sound-absorbing material;
a second sound-absorbing material provided at an upper portion of the external electrode portion; and
an internal electrode portion provided within the second sound-absorbing material and extended in a length direction of the second sound-absorbing material,
wherein the first sound-absorbing material, the second sound-absorbing material, and the external electrode portion are provided separately from each other, and
the internal electrode portion and the external electrode portion are configured as a contact charging type self-power generation module which is arranged to be charged with electricity to generate electricity upon movement of the first sound-absorbing material and the second sound-absorbing material, when the tire moves.

9. The tire of claim 8, wherein the external electrode portion comprises:
a fourth external electrode provided parallel to the internal electrode portion.

10. The tire of claim 9, comprising:
a fixing bar that connects and fixes the first sound-absorbing material, the second sound-absorbing material, and the fourth external electrode; and
an electric wire.

11. A vehicle having in combination:
a vehicle body; and
a tire including a contact charging type self-power generation module configured according to claim 1.

* * * * *